No. 710,018. Patented Sept. 30, 1902.
J. R. SCHMITT.
TOBACCO CONVEYING DEVICE FOR CIGAR BUNCHING MACHINES.
(Application filed Jan. 31, 1900.)
(No Model.) 5 Sheets—Sheet 1.

No. 710,018. Patented Sept. 30, 1902.
J. R. SCHMITT.
TOBACCO CONVEYING DEVICE FOR CIGAR BUNCHING MACHINES.
(Application filed Jan. 31, 1900.)
(No Model.) 5 Sheets—Sheet 2.
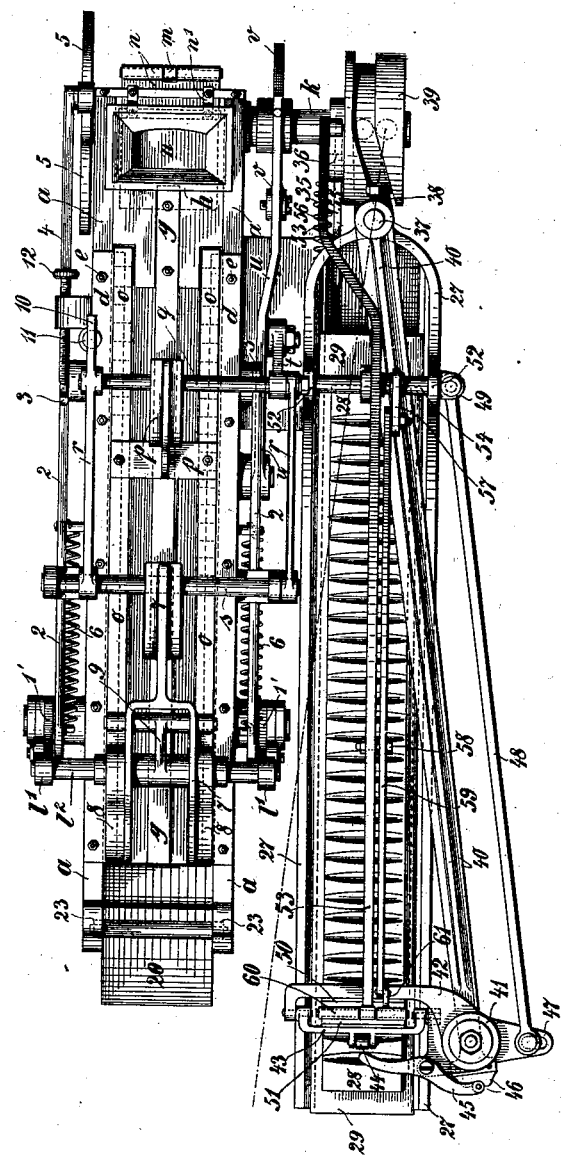

No. 710,018. Patented Sept. 30, 1902.
J. R. SCHMITT.
TOBACCO CONVEYING DEVICE FOR CIGAR BUNCHING MACHINES.
(Application filed Jan. 31, 1900.)
(No Model.) 5 Sheets—Sheet 3.
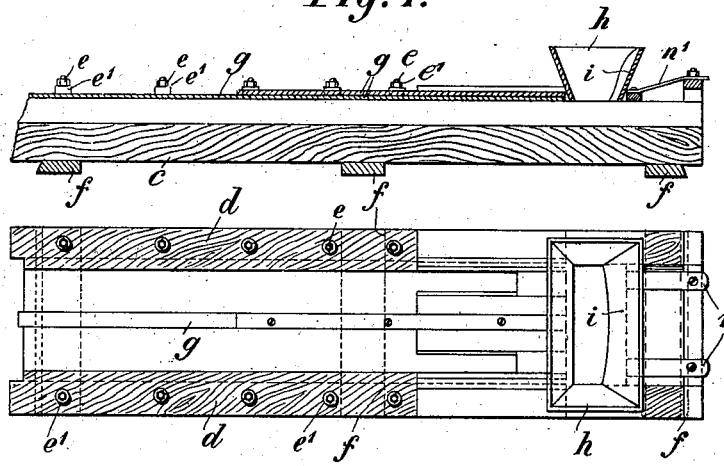
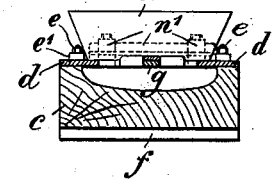
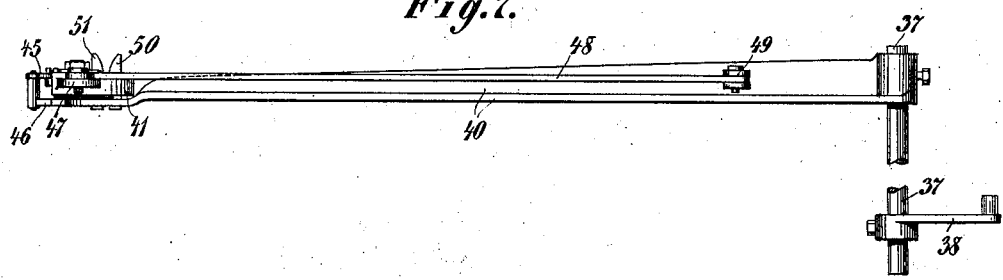
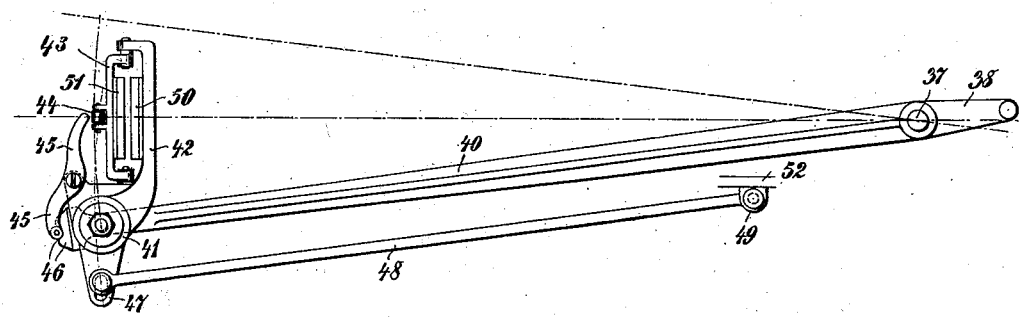

No. 710,018. Patented Sept. 30, 1902.
J. R. SCHMITT.
TOBACCO CONVEYING DEVICE FOR CIGAR BUNCHING MACHINES.
(Application filed Jan. 31, 1900.)
(No Model.) 5 Sheets—Sheet 4.

No. 710,018. Patented Sept. 30, 1902.
J. R. SCHMITT.
TOBACCO CONVEYING DEVICE FOR CIGAR BUNCHING MACHINES.
(Application filed Jan. 31, 1900.)
(No Model.) 5 Sheets—Sheet 5.

Witnesses
W. R. Hammond.
C. F. Somek.

Inventor
Johann Rudolph Schmitt
By Knight Bros.
Attys.

UNITED STATES PATENT OFFICE.

JOHANN RUDOLF SCHMITT, OF OBERRAD, GERMANY.

TOBACCO-CONVEYING DEVICE FOR CIGAR-BUNCHING MACHINES.

SPECIFICATION forming part of Letters Patent No. 710,018, dated September 30, 1902.

Application filed January 31, 1900. Serial No. 3,503. (No model.)

*To all whom it may concern:*

Be it known that I, JOHANN RUDOLF SCHMITT, a subject of the King of Prussia, Emperor of Germany, residing at Oberrad, in the Province of Hesse-Nassau, Kingdom of Prussia, German Empire, have invented certain new and useful Improvements in Tobacco-Conveying Devices for Cigar-Bunching Machines, (for which I have applied for a patent in England, dated December 7, 1899,) of which the following is a specification.

My present invention relates to an improved tobacco-conveying device for cigar-bunching machines; and the objects of my improvements are to maintain a uniform and adjustable density of the tobacco in passing through the machine, to thus facilitate the manipulation of the tobacco and produce cigars of uniform weight and density.

Figure 2:
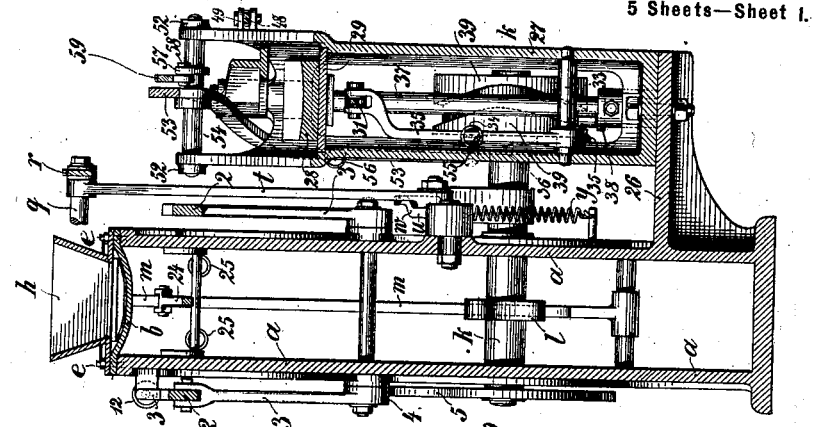
Figure 1:
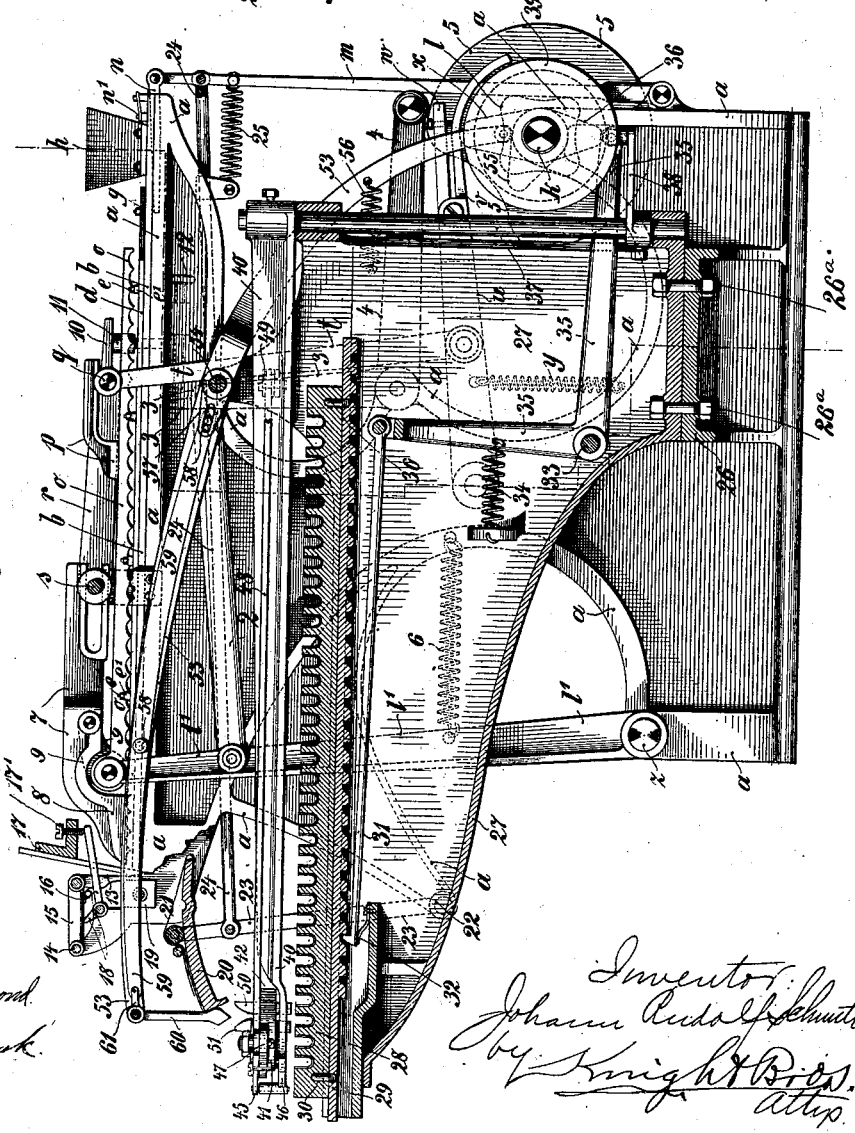
Figure 9:
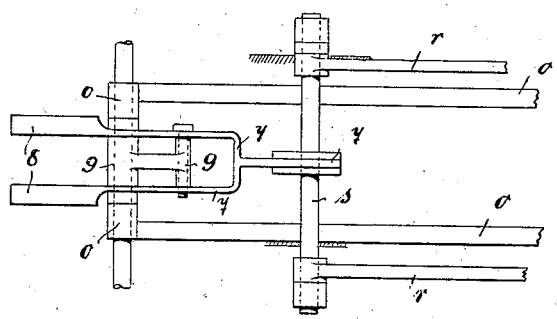
Figure 10:
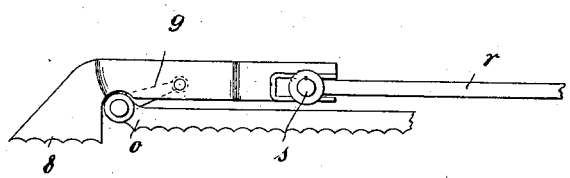
Figure 11:
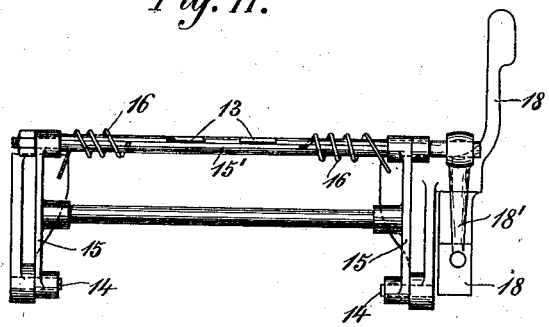
Figure 12:
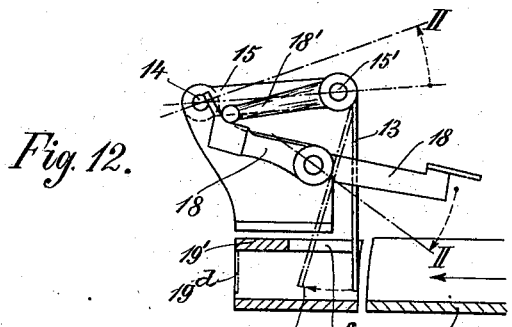
Figure 13:
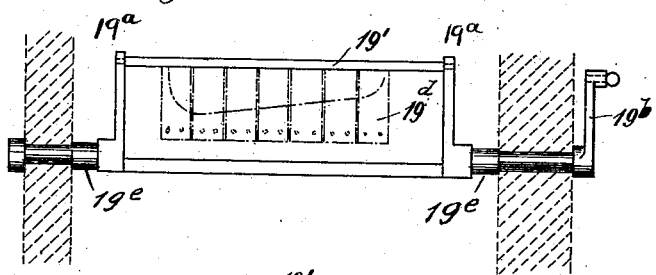
Figure 14:
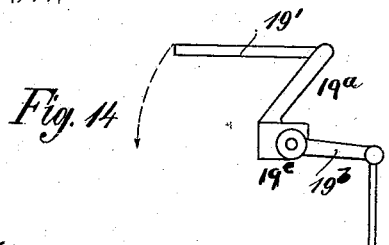

In the accompanying drawings, Figure 1 is a side elevation, partly in section, of a machine for bunching cigars provided with my improved tobacco-conveying device. Fig. 2 is an end view, partly in section, of said machine. Fig. 3 is a plan thereof. Figs. 4, 5, and 6 represent the tobacco-conveying channel in longitudinal section, cross-section, and plan, respectively; and Figs. 7 and 8 represent a side view and plan, respectively, of the mechanism for removing the tobacco bunches from the wrapping-table to the molds. Figs. 9 and 10 represent in detail the mechanism for operating the feed-rack and carrier for advancing the tobacco. Fig. 11 is a plan of the retarding device on a larger scale. Fig. 12 is a side elevation of the same, likewise showing the mouthpiece. Fig. 13 is a front elevation of the pivoted mouthpiece. Fig. 14 is a side elevation of the same.

Similar characters refer to similar parts throughout the several views.

The frame of the machine consists of the standard $a$, shelf 26, and bracket 27, the standard and shelf being cast in one piece. The bracket 27 is secured to the shelf 26 by means of screws (or bolts $26^a$.) In the standard $a$ a shaft $k$ is rotatably mounted in bearings, and upon this shaft are mounted the cams or tappets $x$, 5, 1, 39, and 55 to actuate the moving parts of the machine, as hereinafter described. The cam or tappet $x$ is so arranged as to engage with the adjustable finger $v$ on the lever $u$ by the rotation of the shaft $k$. Pivoted to this lever is the rod $t$, the upper end of which is connected to the spindle $q$, so as to impart an elliptical stroke to feeding-racks $o$, as hereinafter described. A spiral spring $y$ connects the lever $u$ to the standard in order to draw the finger $v$ of lever $u$ into contact with the tappet $x$. The spindle $q$ is connected to a spindle $s$ by the coupling-pieces $r$, one of which is prolonged into a finger 10, which engages an adjusting-screw 11, which limits or regulates the throw of the links or coupling-pieces $r$.

The cam 5 engages with the horizontal arm 4 of a bell-crank lever having two vertical arms 3, keyed on a common shaft, as shown in Fig. 2, and each connected by a link 2 with a vertical lever 1', which levers are fulcrumed on a shaft $z$ and are each connected by a spring 6 with the frame-standard $a$, so as to retract them when released by the cam 5. A stop-screw 12 is provided to limit and regulate the movement of the levers 3.

The machine is provided with a removable trough $b$ for conveying the tobacco, formed in transverse section to correspond approximately with the longitudinal section of the cigar-fillers to be produced. In practice a number of such removable troughs are employed interchangeably for different forms of fillers.

Above the tobacco-conveying channel or trough $b$, Figs. 4 and 5, are secured the elastic plates $d$, which project partially over the top of the channel (see Figs. 2 and 5) and are secured to the top of the trough or channel by screws $e$, rubber washers $e'$ being interposed, as shown in Figs. 2, 4, 5, and 6. The channel or trough $b$ is fastened to the standard $a$ by means of the iron rails $f$, secured to the bottom of it, and can easily be removed and another be substituted in its place. This is of importance, because it makes it possible to produce any desired form of filler on one and the same machine by simply exchanging the channel or trough $b$, which can be quickly done. At the right end of the conveying channel or trough $b$ is provided a hopper $h$, Fig. 4, which is lined on one side, as shown at $i$.

A bar $g$, consisting of a number of metallic bands or ribbons soldered together for the purpose of affording a certain amount of elasticity, is secured by its ends longitudinally over the center of the trough $b$ to confine the tobacco therein with elastic pressure. On both sides of the bar $g$, between it and the plates $d$, are the sliding racks $o$, having downwardly-projecting teeth to catch and feed the tobacco in their forward movement. These racks are connected by the bridge-piece $p$, which is formed with a fork-shaped end engaging the spindle $q$, as shown in Figs. 1 and 3. The spindle $q$ is coupled to the shaft $s$ by means of the rods $r$, pivoted on said shaft, and receives a vertical vibratory movement from the rod $t$ and series of levers $u$, $v$, and $w$, actuated by a cam $x$, secured on the main shaft $k$. The racks $o$ are supported at the right end by the spindle $q$ and are connected at the left to the upper ends of the vertical levers 1', Fig. 1, which are fulcrumed on the bolt $z$. These levers receive a vibratory movement from the links 2 and bell-crank lever 3 4 and the cam 5 on the main shaft $k$, in conjunction with the springs 6. The levers 1' are indirectly coupled at their free ends, through the medium of the link 9, to the bow 7, which is connected to the racks $o$ by the link 9. The bow 7 is bifurcated horizontally at its left end and carries at this bifurcated end the downwardly-projecting feeding-arms 8, Figs. 9 and 10, which are formed with serrations or concavities at bottom to forward the tobacco to the cutter. The bow 7 has at its right end a vertical fork sliding on the fixed shaft $s$, on whose ends the connecting-rods $r$ oscillate, and on being moved not only operates the racks $o$ back and forth, but also describes an oscillating motion about the shaft $s$, the hollow portion of the bow being moved about the hubs of the racks $o$.

At the left end of the transport-trough $b$ is provided a retarding device, Figs. 1, 11, and 12, which prevents the tobacco from expanding endwise. This device consists of two or more plates 13, which are rigidly secured to the rod 15', which braces the two lever 15, but is rotatable therein. The levers 15 turn on pins 14, which are mounted in small standards, and the plates 13 are continuously held up to their work against the end of the transport-channel by springs 16 on the rod 15'. The position of the plates is shown in Fig. 12, from which it will be seen that they project through a slot $19^c$ in the top of the mouthpiece 19'. The tobacco advanced in the channel $b$ presses against the plates 13, so that these turn with their shaft 15' against the resistance of the springs 16 to the dotted position I, Fig. 12.

17 represents a cutter and separator of common form which is forced down in usual and well-known manner to separate the required amount of tobacco for a charge or filler. The arm or plunger in which the cutter is mounted carries an adjustable stop 17', which when the cutter is depressed bears on the longer arm of a bell-crank lever 18, pivoted to the stationary frame. On the downward movement of the cutter and separator 17 the plates 13, the shaft 15', and the levers 15, turning on the pins 14, are raised to the dotted position 11 by means of the finger 18', situated on the shaft 15', and the lever 18, so that these plates 13 are entirely removed out of the mouthpiece 19, Fig. 1. The mouthpiece is situated at the front or exit end of the transport-trough, Figs. 1 and 12, and is closed in the direction of the transport-channel by an elastic leather diaphragm $19^d$, as represented in dotted lines in Fig. 12, said diaphragm being supported by an insertion-piece. (Not shown in the drawings.) The chief constituent of the mouthpiece is in this connection the top 19', which is pivoted between two oblique side arms $19^a$, Figs. 13 and 14, and is connected by these with the side pivots $19^e$. These pivots $19^e$ turn in bearings in the frame, and on one of them is keyed an operating-crank $19^b$ to impart an oscillating motion, as indicated by dotted line in Fig. 14. Beneath this mouthpiece and connected to the standard is the wrapping-plate 20, on which the apron 21 is arranged.

The apron is actuated by the lever 23, which is pivoted to the frame at 22. Connected to this lever 23 at one end is the rod 24, the other end of which is secured to the lever $m$, which is pivoted at its lower end to the standard and is connected near its upper end to the standard by a spiral spring 25. The cam 1 on the shaft $k$ engages this lever $m$. To the top of the lever $m$ a plunger $n$ is secured, which projects into the trough $b$.

The plate 29, upon which the mold 28 is mounted, is connected by means of the pins 30 and having downwardly-projecting teeth is slidably arranged upon the bracket 27. An elongated pawl 31 engages with the teeth on the under side of the plate 29, being kept in engagement by the spring 32. The other end of the elongated pawl is connected to one arm of a bell-crank lever 35, which is pivoted to the frame at 33. The other arm of this bell-crank lever engages with the cam 36, which is mounted upon the shaft $k$, and a spiral spring 34 is interposed between the bell-crank lever 35 and the standard.

The mechanism for moving the tobacco bunches from the wrapping-table 20 to the mold-plate 28 consists of the beam 40, mounted upon the vertical shaft 37, a lever 38, secured on the lower end of this shaft, and a face-cam 39, mounted on the shaft $k$, and catchers 50 and 51.

A headpiece 41 is provided on the free end of the beam 40. To this headpiece a rigid arm 42 is secured, and to this arm a swiveling part 43 is secured, on the outer side of which a roller 44 is provided. In the same plane as the roller 44 a lever 45 is pivoted, the one end of which bears on the roller 44, while the other end enters into a depression 46 on the end of lever 40. A slotted arm 47 is secured to the headpiece, and a rod 48 is jointed to this arm at the one end and to the frame at the other end 49. This catcher 50, which is secured to the arm 42, is rigid, while the other, 51, can move with the swiveling part 43.

The bracket 27 carries a spindle 54, which serves as a fulcrum for a long curved arm 53. The one end of this arm engages the cam 55, mounted on the shaft $k$, and the other end of the arm is pivoted to the plunger 60. A spiral spring 56 keeps the curved arm in contact with the cam 55. On the spindle 54 a small lever 57 is mounted, and to the end of this lever a long lever 59, which is pivoted at 58, is jointed. The other end of the lever 59 is jointed to the arm 61, which is rigidly secured to or made in one piece with the hub of the plunger 60.

The operation of the machine is as follows: On the shaft $k$ rotating the cam $x$ and the spring $y$ will cause the lever $u$, and consequently the rod $t$ and the racks $o$, to reciprocate in a vertical direction. In the same manner the cam 5 and spring 6 will cause the lever $1'$ to reciprocate about the fulcrum $z$, so that the racks $o$ will be given a longitudinal motion in addition to their vertical reciprocating motion. The combination of these two motions causes every point on the racks to describe a path of an approximately elliptical form. The cam 1 and the spring 25 will cause the rod $m$, and consequently the plunger $n$, to reciprocate backward and forward horizontally. The tobacco is fed into the hopper $h$ and is forced toward the left, Fig. 1, by the reciprocating plunger $n$. After leaving the plunger $n$ the tobacco is caught and further advanced by the racks $o$, which, inasmuch as they describe an approximately elliptical path, will press on the tobacco when passing toward the left and rise above the same when passing toward the right, Fig. 1. In this manner the tobacco is fed up to the left end of the conveying-trough, and during its passage along the channel it is prevented from expanding by the plates $d$ and bar $g$, and at the left end of the channel expansion is further prevented by the retarder 13. The requisite amount of tobacco is now cut off by the cutter 17. When the cutter 17 descends, it acts upon one arm of the bell-crank lever 18, the other arm of which raises the lever 15, and consequently the retarder 13, so that the mouthpiece can turn through ninety degrees without the tobacco being destroyed by the retarders 13, and a plunger (not shown in the drawings because of well-known construction) forces the charge out of the mouthpiece onto the wrapping-table 20. When the cutter 17 rises, the retarder 13 falls back into its first position under the action of the spring 16. When the wrapping of the charge has been effected, which is done in the known manner by the reciprocation of the lever 23, the charge falls into the catchers 50 and 51, which at the moment are in a direct line underneath the wrapping-table 20. The catchers 50 and 51, being, as above described, arranged on the end of the beam 40, are now moved by this beam under the action of the face-cam 39, lever 38, and spindle 37 over the mold-plate 28. By reason of the arm 47 and rod 48 the catcher is in this position parallel to the molds. While the charge is being moved by the catchers from the position underneath the wrapping-table 20 to the position above the mold-plate, the smaller lever 45, Fig. 8, is pressed against the roller 44 by the projection on which the other end of this lever 45 then bears, and the catchers are in this manner caused to exercise a certain amount of pressure on the charge they contain. When the catchers 50 and 51 rise above the molds, the one end of the lever 45 enters into the depression 46 and the roller 44 is released. The plunger 60, secured to the end of the curved beam 53, is now caused to descend, owing to the action of the cam 55, and the bunch is forced out of the catchers into a compartment of the mold-plate. When this has taken place, the cam 36 acts upon the bell-crank lever 35 and the rod 31 is moved toward the right. By the hook on the left end of this rod 31, which engages with the teeth on the under side of the plate 29, this plate is moved through the distance between two compartments. When all the compartments have been filled and the mold 28 has reached the end of its path, which may be announced by a customary alarm, a new mold can be placed into position.

What I claim as new, and desire to secure by Letters Patent, is—

1. The combination of the hopper $h$, exchangeable, channeled conveying-trough $b$, side bars $d$ and central elastic bar $g$ serving to hold down the tobacco in the trough with yielding pressure, as described.

2. In a machine of the character described, the combination of a tobacco-conveying trough $b$; a pair of reciprocating compressing and feeding racks $o$; reciprocating feeding-arms 8, the forked arm 7 and link 9 connecting the feeding-arms 8 and racks $o$; suitable lever mechanism connected with the racks and feeding-arms, adapted to move them forward and backward above the trough; independent lever mechanism engaging the racks and adapted to raise and lower them; and connecting-rods $r$, on which the raising and lowering device oscillates, substantially as set forth.

3. In a machine of the character described, the combination of a tobacco-conveying trough $b$ having a cross-section corresponding to the form of the bunches to be made, the compressing and feeding racks $o$ and the feeding-arms 8 operating above the conveying-trough $b$, the connecting-rods $r$; the forked arm 7 and link 9 connecting feeding-arms 8 and racks $o$; levers $1'$ suitably connected with the racks $o$ and feeding-arms 8, means for oscillating said levers $1'$, rods $t$ suitably connected with the lever $u$ and the other lever, and suitable mechanism for oscillating the lever $u$, substantially as and for the purpose set forth.

4. In a machine of the character described, the combination of a tobacco-conveying trough $b$; the levers $1'$; the racks $o$ journaled at one end to the levers $1'$, the feeding-arms 8 formed with a rearwardly-projecting yoke portion 7, a rod or bar engaging the yoke portion 7, a link 9 connecting the feeding-arms 8 with the racks $o$, a yoke $p$ mounted upon the feeding-racks $o$, a bar $q$ engaging the yoke $p$, a link $r$ connecting bar $q$ with the ridged bar $s$, and suitable means for raising and lowering the bar $q$, substantially as and for the purpose set forth.

5. In a machine of the character described, the combination of a tobacco-conveying trough $b$, with a compressing and feeding rack $o$, means for reciprocating the rack $o$, and a spring-bar $g$ engaging the tobacco in the trough to prevent its expansion, substantially as set forth.

6. In a machine of the character described, the combination of a tobacco-conveying trough $b$, with the plates $d$, and spring-bar $g$, adapted to prevent the expansion of the tobacco in the trough, the compressing and feeding racks $o$ operating in trough $b$, the feeding-arms 8 operating in the trough $b$ in front of the racks, and means for operating the racks and feeding-arms to cause them to operate successively upon the tobacco, substantially as set forth.

7. In a machine of the character described, the combination of a tobacco-conveying trough $b$, and means for compressing and feeding tobacco therein, with a retarding device comprising spring-pressed plates arranged at the outlet end of the trough to retain the tobacco while being cut, and a cutter operating at the end of the trough and adapted to sever the successive charges from the tobacco in the trough, substantially as set forth.

8. In a machine of the character described, the combination of a tobacco-conveying trough $b$ and means for compressing and feeding tobacco therein, with the spring-pressed tobacco-retarding plates 13 arranged at the outlet end of the trough, the reciprocating cutter 17, and means operated by the cutter for raising the plates, substantially as set forth.

9. In a machine of the character described, the combination of a tobacco-conveying trough $b$ and means for compressing and feeding tobacco therein, with the spring-pressed tobacco-retarding plates 13 arranged at the outlet end of the trough, the reciprocating cutter 17, the lever 15, supporting-plates 13, the bell-crank lever 18 engaging lever 15, and an adjustable device carried by cutter 17 and adapted to engage and operate lever 18, substantially as and for the purpose set forth.

10. The combination of the wrapping-table 20 and suitable means for applying the wrapper; a mold 28 for receiving the bunches after wrapping; the vertical rock-shaft 37, lever 38 and cam 39 for oscillating said shaft; the beam 40 mounted on said rock-shaft and receiving horizontal reciprocating movement therefrom; the headpiece 41 mounted on the free end of the beam 40; the rigid arm 42 mounted on the headpiece 41; the swiveled yoke 43 carried by the arm 42; the roller 44 mounted in the swiveled yoke 43; the lever 45 fulcrumed intermediately of its ends and bearing at one end against the roller 44 and at the other end against the end of the beam 40 and the catching-jaws 50, 51 operating to carry the wrapper-bunches from the wrapping-table to the mold, substantially as described.

In testimony whereof I have hereunto set my hand in the presence of two witnesses.

JOHANN RUDOLF SCHMITT.

Witnesses:
RICHARD GUENTHER,
CARL GRUND.